United States Patent [19]

Myers et al.

[11] 4,443,995
[45] Apr. 24, 1984

[54] METERING DEVICE AND METHOD

[75] Inventors: John H. Myers, Emerson; Edward Waleck, Closter, both of N.J.

[73] Assignee: Federal Paper Board Co., Inc., Montvale, N.J.

[21] Appl. No.: 276,452

[22] Filed: Jun. 23, 1981

[51] Int. Cl.³ .................... B65B 35/30; B65B 11/08
[52] U.S. Cl. ..................................... 53/443; 53/466; 53/531; 53/209; 198/425; 198/456
[58] Field of Search ............... 53/209, 443, 466, 531, 53/543, 590; 198/425, 432, 440, 456

[56] References Cited

U.S. PATENT DOCUMENTS

| | | | |
|---|---|---|---|
| 1,923,753 | 8/1933 | Scofield | 198/425 |
| 2,878,919 | 3/1959 | Jones | 198/425 |
| 2,932,929 | 4/1960 | Fahrenbach | 53/209 |
| 3,165,871 | 1/1965 | Roth | 53/543 X |
| 3,403,772 | 10/1968 | Vadas | 198/425 |
| 3,469,673 | 9/1969 | Gentry | 198/440 |
| 3,575,278 | 4/1971 | Hoffman | 198/425 X |
| 3,729,886 | 5/1973 | Lucas | 53/209 X |
| 3,815,320 | 6/1974 | Ganz | 53/209 X |
| 4,238,024 | 12/1980 | Hirakawa | 198/425 |
| 4,283,245 | 8/1981 | Benoit | 198/440 |
| 4,296,590 | 10/1981 | Focke | 53/209 X |

FOREIGN PATENT DOCUMENTS

| | | | |
|---|---|---|---|
| 2402972 | 7/1975 | Fed. Rep. of Germany | 198/440 |
| 2259769 | 8/1975 | Fed. Rep. of Germany | 198/425 |
| 616190 | 7/1978 | U.S.S.R. | 53/543 |

Primary Examiner—John Sipos
Attorney, Agent, or Firm—Charles E. Brown

[57] ABSTRACT

This relates to a metering device particularly adapted for separating articles being conveyed in end-to-end relation and in side-by-side rows into sets of transversely aligned articles with adjacent sets of articles being displaced in a direction transversely to the direction of movement of the articles so as to provide for the metering or separation of the articles of adjacent sets. To this end there is provided a metering device which includes a pair of endless conveyors having opposed runs and each endless conveyor including first and second sets of article supports or carriers with one set of such article supports or carriers of each conveyor being transversely offset and the article supports or carriers being of the same length in a longitudinal direction as the length of the articles or a unit multiple of such articles. The transverse offsetting of articles of longitudinally adjacent sets serves to automatically transverse the aligned articles of each set.

20 Claims, 4 Drawing Figures

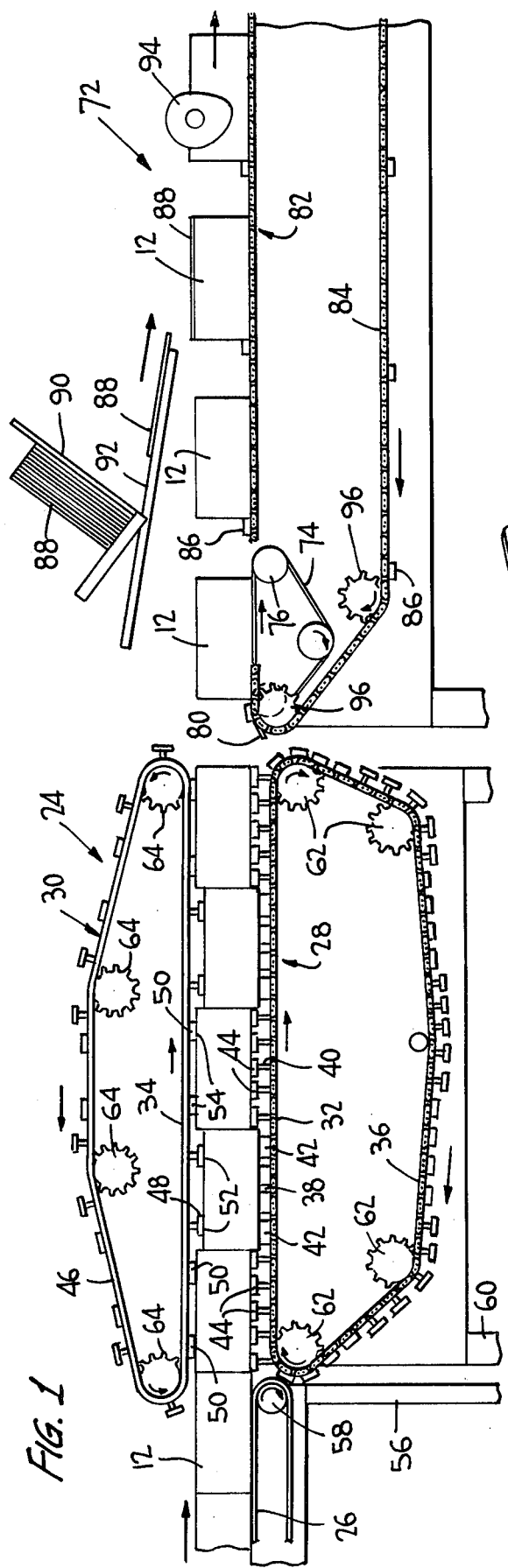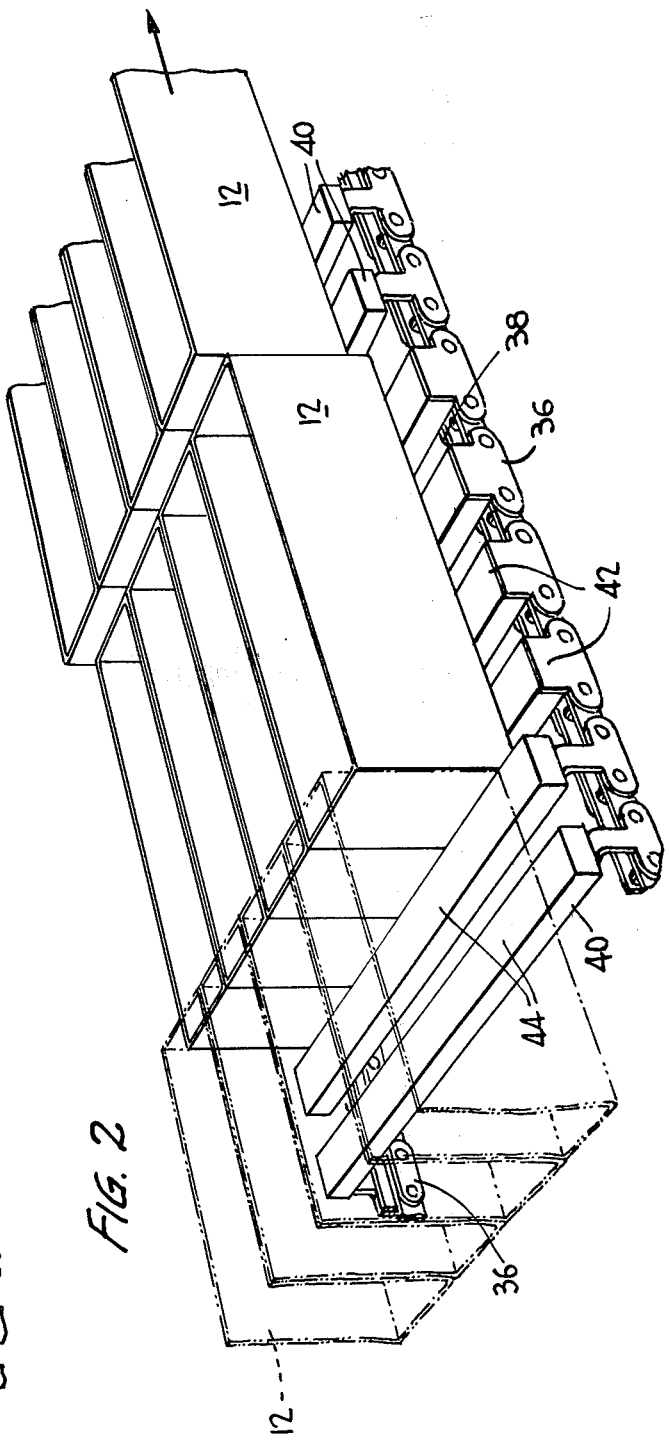

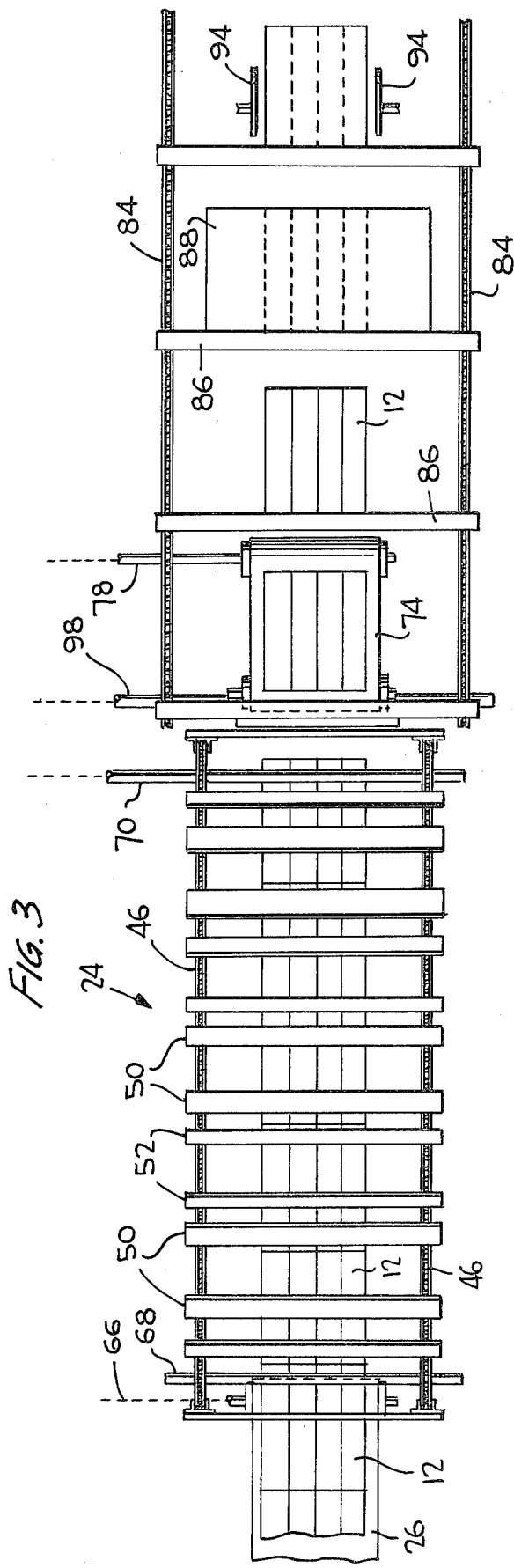
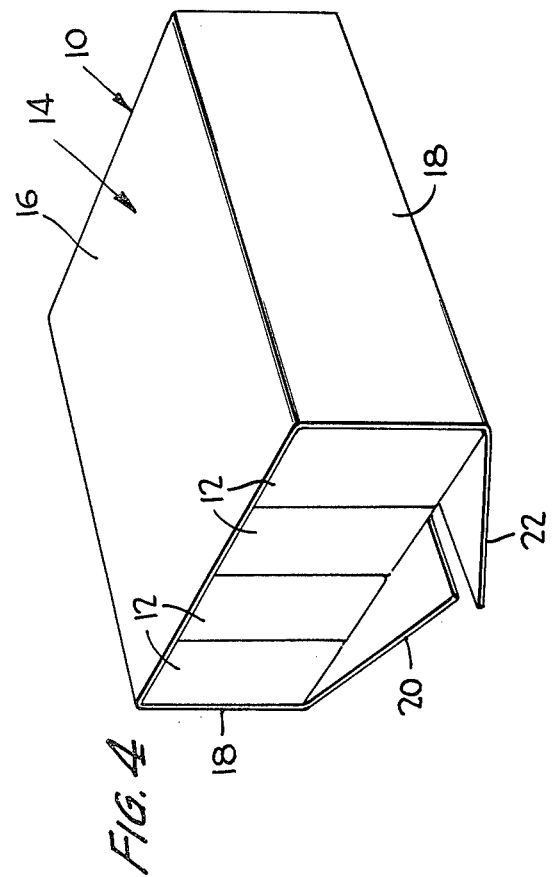
FIG. 3
FIG. 4

METERING DEVICE AND METHOD

This invention relates in general to new and useful improvements in metering devices, and more particularly to a device for metering or separating articles being conveyed in a plurality of adjacent rows and in end-to-end relation into separate sets of articles which may be readily wrapped to form a package.

This invention particularly relates to the metering and packaging of articles which are rectangular in plan and cannot be metered or separated in the conventional manner.

It is conventional to package bottles and like containers which are circular or oval in outline by supplying the bottles and the like in a plurality of adjacent rows and in touching relation. The bottles, however, can be separated into groups or sets by conveyor means including upstanding pins which will pass up between adjacent bottles and engage rearwardly a bottles so as to convey the bottles along a predetermined path. These pins, furthermore, can be utilized to separate the bottles in sets or groups for packaging. However, when the articles to be packaged are rectangular in plan, there is no space between the articles, either to the side of the articles or at the end of the articles whereby the articles may be conveyed by pins. Accordingly, in the past, it has been inconvenient to separate such articles into sets or group for wrapping into packages.

In accordance with this invention, the articles to be packaged are conveyed in end-to-end relation and side-by-side relation in rows to a metering device. The metering device is in the form of a conveyor which transversely offsets every other set of articles with respect to the line of movement of the articles. The offsetting of every other set of articles displaces one set of articles relative to the other and thereby assures that all articles of a set are transversely aligned whereby the transversely aligned set of articles may be conveyed and thereby separated as a unit for packaging.

Most particularly, in accordance with this invention there is provided a metering device which is in the form of a pair of endless conveyors having opposed runs with each conveyor having first and second sets of article supports. The article supports of one set are transversely offset with respect to the article supports of the other set. Further, the article supports at one conveyor are transversely aligned with aligned article supports offset in the same direction. In this manner, the articles of each set are firmly gripped by the article supports of the two conveyors which serve to maintain the separated articles of each set in a compact grouping for further handling.

It is preferred that the article supports or carriers be offset in a vertical direction although they may equally as well be offset in a horizontal direction. Further, while in the simplest form of the invention only the one set of article supports or carriers are offset from the paths of movement of the carriers, it is feasible to offset both sets of article supports or carriers of the two conveyors in opposite directions so that one set of article supports is up and the other is down, for example.

It is also preferred that the article supports of each set be of a length equal to the length of the articles being conveyed and separated. Thus the article supports of the conveyors which are in overlapping relation to the articles in the offset relationship of the articles serve to push the articles of a preceding set of articles to assure transverse alignment of the articles of the set.

Further, in accordance with this invention, the separated sets of articles are directed to a speed up conveyor wherein each separated set of articles is rapidly advanced relative to a trailing set of articles, afterwhich the spaced sets of articles are uniformly conveyed and may be wrapped by conventional wrapping means into packages.

With the above, and other objects in view that will hereinafter appear, the nature of the invention will be more clearly understood by reference to the following detailed description, the appended claims and the several views illustrated in the accompanying drawings.

FIG. 1 is a schematic side elevational view of a packaging apparatus incorporating the metering device of this invention.

FIG. 2 is an enlarged fragmentary perspective view showing the manner in which articles of adjacent sets are offset relative to one another so as to separate the articles of one side relative to the articles of adjacent sets.

FIG. 3 is a schematic plan view of the apparatus of FIG. 1 and shows further details thereof.

FIG. 4 is a perspective view of a set of articles and shows the same in the process of being wrapped by a paperboard jacket.

Referring now to the drawings in detail, reference is first made to FIG. 4 wherein there is illustrated a partially formed package 10 which includes a plurality of articles 12 disposed in side-by-side, transversely aligned relation. The articles 12 are in the process of being wrapped by a paperboard wrapper 14 which includes a central panel 16 that overlies the articles 12. The wrapper 14 also includes side panels 18 which extend down alongside the set of articles. Each side panel 18 carries a bottom closure flap 20, 22 which may be automatically interlocked with one another to form a complete package. The manner in which the jacket 14 is applied to the articles 12 is conventional and not a part of this invention.

It is to be noted that the articles 12 are illustrated in the form of elongated, rectangular in plan, boxes or cartons. The boxes 12 may either be closed or may be open at the top. For example, the boxes 12 could be open at the top and suitable small packages placed therein.

It would be readily apparent from FIG. 3 that when the boxes 12 are being conveyed in end-to-end and side-by-side relation, there is no way that fingers, pins or the like may be engaged behind the boxes or cartons 12 so as to separate them into groups or sets as is conventional in the packaging of circular articles, such as bottles, cans, etc. It is to this end that a metering device 24 is provided.

First of all, it is to be understood that that articles in the form of cartons or boxes 12 are conveyed by a supply conveyor 26 in side-by-side rows and in end-to-end relation. However, because the articles 12 may possibly be of slightly different lengths and because there can be longitudinal displacement of articles at one row relative to the other, it is necessary that each set or group of articles be first transversely aligned and then separated into individual groups or sets for wrapping. This is the function of the metering device 24.

The metering device 24 includes a lower conveyor 28 and an upper conveyor 30 with the conveyors 28 and 30 having parallel runs 32 and 34 in vertically spaced relation.

The conveyor 28 includes a pair of transversely spaced endless conveyor elements which are preferably in the form of chains 36. The chains 36 carry and have extending therebetween first and second sets 38, 40 with the sets being arranged in alternating relation. Each set 38 of supports includes a plurality of transversely extending bars 42 which extend between the conveyor chains 36 and are suitably secured thereto as is shown in FIG. 2. Further, each set of supports 40 includes a plurality of transversely extending support bars 44 which are also transversely disposed and are secured to the chains 36 for movement therewith. However, the supports 44 are mounted differently from the support bars 42 so that the support bars 42 are transversely (vertically) offset relative to the bars 44.

It is also pointed out here that the effective longitudinal length of each set of supports 38 and 40 is equal to the length of the articles 12. Thus, as shown in FIG. 2, the set of articles 12 which are seated on the support bars 42 are transversely offset or lowered relative to the articles of the adjacent sets and fully occupy the space between the bars 44 of the adjacent support sets 40. Thus the leading support bar 44 of each support set 40 serves to push against the trailing ends of the articles 12 of the preceding set of articles so as to assure transverse alignment of articles of each set of articles. In this manner separation of the adjacent sets of articles is assured while transverse alignment is also assured.

The conveyor 30 also is formed of two endless conveyor members, preferably in the form of conveyor chains 46 which are transversely spaced. The conveyor chains 46 carry first and second sets 48, 50 of supports or carriers for the article sets. The sets of carriers 48, 50 are disposed in alternating relation and in transverse alignment with the support sets 38 and 40, respectively.

Each support set 48 includes at least two support or carrier bars 52 which extend transversely between and are secured to the chains 46 while each support or carrier set 50 includes at least two transverse carrier bars 54 which are also secured to and extend between the conveyor chains 46. The bars 52 are offset downwardly towards the bars 42 and are spaced from the bars 42 a distance substantially equal to the height of the articles 12 to be separated. In a like manner, the bars 50 are vertically spaced relative to the bars 44 a like distance.

At this time it is pointed out that the conveyor 26 is carried by a suitable support structure 56 and includes suitable support rolls 58 of which only one is illustrated. One of the support rolls 58 will be driven so as to drive the conveyor belt 26 at a preselected speed.

It is also to be understood that the metering device 30 includes a suitable support frame 60 and that the conveyor 28 has the conveyor chains 36 thereof positioned and driven by suitable sprockets 62. At least one set of the sprockets 62 will be driven so as to drive the conveyor chains 36. In a like manner, the conveyor chains 46 pass around suitable sprockets 64 of which at least one is driven so as to both position and drive the conveyor chains 46.

In FIG. 3, the illustrated roll 58 is illustrated as having a drive shaft 66 while the rearmost sprocket 62 has been illustrated as having a drive shaft 68. The forwardmost sprocket 64 has been illustrated as having a drive shaft 70. It is to be understood that suitable drive means (not shown) will drive the drive shafts 66, 68 and 70 in unison so that the conveyor 26 and the conveyor belts 36 and 46 will have the same rate of forward movement.

It will be readily apparent from FIG. 1 that the support bars 44 are disposed at the same height as the upper surface of the conveyor belt 26. Thus those articles which pass into overlying relation with respect to the support or carrier bars 44 do not necessarily change elevation or are not necessarily transversely displaced. The upper support or carrier bars 50 associated with the support bars 44 serve to lightly clamp and hold the articles 12 on the bars 44.

As the following set of bars 42 pass under the next following set of articles, the forward ends of those articles would dip down below the trailing bar 44 of the preceding set of bars due to the downward offsetting of the bars 42 so as to align the forward ends of the articles of the following set of articles. Eventually this set of articles will drop down into the space between the two spaced sets of bars 40, as is shown in FIG. 2 and thus this set of articles will be separated from both the preceding articles and the following articles while transverse alignment of the articles is assured.

As the third set of articles approaches the metering device 24, the forward ends thereof will be positioned by the trailing ends of the articles of the preceding set as they are engaged by and supported by the bars 44. At the same time, the leading bar 44 of this set of bars will engage the trailing ends of the articles of the preceding set of articles and serve to insure transverse alignment of the articles of that set.

This will continue with one set of articles being transversely displaced downwardly and the other continuing to be maintained in the original plane. At the same time, the articles supported by the sets of bars 42 and the sets of bars 44 will be maintained in position by the cooperating respective sets of bars 54 and 52.

The vertically separated and transversely aligned sets of articles are now ready for longitudinal separation and packaging. Accordingly, they pass from the metering device 24 into a packaging unit 72 of which only a portion is shown. The packaging unit 72 includes a relatively short speed-up conveyor 74 which has a linear speed greater than that of the conveyor 26 and the conveyor chains 36 and 46. Thus as articles of a leading set of articles being discharged from the metering device 24 become engaged with the conveyor 74, they are rapidly fed away from the metering device 24 so as to space previously touching adjacent sets of articles.

The speed-up conveyor 74 is carried by suitable rollers 76 and will be driven through a drive shaft 78 in conjunction with the drives of the conveyor 26 and the metering device 24, but at a more rapid linear rate.

Inasmuch as the upper surface of the conveyor 74 is at the same elevation as the conveyor 26, it will be seen that the articles 12 carried by the support bars 44 will pass directly onto the conveyor belt 74. However, the sets of articles carried by the bars 42 will be below the elevation of the upper surface of the conveyor belt 74 and will engage an intermediate ramp 80 so as to be elevated onto the surface of the conveyor 74.

The packaging mechanism 72 also includes a main feed conveyor generally identified by the numeral 82. The main feed conveyor includes a pair of transversely spaced conveyor chains 84 which have extending therebetween and secured thereto transverse pusher bars 86. It is to be understood that each set of articles 12 rapidly advanced by the conveyor 74 will be fed onto a suitable support plate (not shown). The rear edges of the articles of each set will be engaged by a respective pusher bar 86 and set along this support plate or bars by the pusher bars 86 in a predetermined longitudinally spaced relation as shown at the right hand side of FIG. 1. With the sets of articles 12 being properly spaced and the articles of each set being transversely aligned, each set of articles is now ready to be wrapped into a package in a conventional manner. Accordingly, a jacket blank 88 is fed from a hopper 90 by a feed mechanism 92 into overlying relation to each set of articles. The blank 88 is then folded down around the articles by means of suitable folders 94 and then the flaps 20, 22 are folded up beneath the articles in a manner generally schematically illustrated in FIG. 4 and interlock to form a complete package.

At this time it is pointed out that the conveyor chains 84 pass over and are supported by means of suitable sprockets 96 with one of the sets of sprockets being driven, for example, by a drive shaft 98 (FIG. 3). The driving of this drive shaft is coordinated with the driving of the other of the drive shafts.

In view of the fact that this invention is primarily directed to the details of the metering device 24 and since the manner in which the sets of articles will be supported and otherwise positioned will be conventional, no attempt has been made to specifically illustrate the details of such support and positioning means. It is to be understood, however, while the invention has been illustrated with respect to articles arranged in four transversely adjacent rows, the number of rows of articles may be varied depending upon the size of the articles to be packaged and the number of articles in each set.

It is also feasible that each set of articles, instead of including one article in each row may include several articles in each row if desired. In other words, instead of four articles being packaged as a set, eight or twelve articles could be packaged as a set.

It is also pointed out here that while it is preferred that the support bars of the conveyors 28 and 30 are vertically offset, it is to be understood that the support bars 42, 44, 52 and 54 may be vertically disposed and the offsetting could be in horizontal direction. This can be envisioned by reference to FIG. 1 wherein the metering device 24 could be viewed as though illustrated in plan.

Although the metering device has been specifically illustrated and described as being operable in conjunction with articles conveyed in a plurality of transversely adjacent rows and the metering device has functioned to separate transversely adjacent articles into sets of transversely aligned articles, it is to be understood that the metering device is not so limited. The metering device could very well be utilized where a plurality of trays or generally rectangular open top boxes are conveyed in a single row and it is desired to separate each tray or box, or like article, from its following tray or box so that it may be conveniently separately handled and wrapped with the wrapper forming the closing mechanism.

Although only a preferred embodiment of the metering device and associated packaging mechanism have been specifically illustrated and described herein, it is to be understood that minor variations may be made in the metering device and packaging system without departing from the spirit and scope of the invention as defined by the appended claims.

We claim:

1. A method of metering articles supplied in end-to-end relation into separate units, said method comprising the step of continuously feeding the articles along a path at a preselected speed and in longitudinal end-to-end touching relation, and without changing the speed of the articles transversely offsetting every other article a distance less than the transverse dimension of said articles relative to said path and to adjacent articles at opposite ends of each said every other article while maintaining said touching relationship, said articles being supplied in laterally adjacent rows and articles from said rows being separated into sets of laterally aligned articles by said offsetting, and transversely offset adjacent sets of articles laterally align articles of each set due to the end-to-end touching relation of articles of adjacent sets during said transversely offsetting.

2. A method according to claim 1 wherein transversely offset adjacent sets of articles maintain articles of each set in laterally aligned relation for separation of longitudinally adjacent ones of said sets of articles from one another for removal as sets.

3. A method according to claim 2 wherein said longitudinally adjacent sets of articles are sequentially advanced in speed to longitudinally space said longitudinally adjacent sets of articles to provide a series of longitudinally spaced sets each formed of a plurality of laterally aligned articles.

4. A method according to claim 3 wherein said longitudinally spaced sets of laterally aligned articles are formed into individual packages.

5. A method according to claim 3 wherein said longitudinally spaced sets of laterally aligned articles are formed into individual packages by the application of a package forming wrapper.

6. A method according to claim 1 wherein said path is a generally horizontal path, and said offsetting is generally vertical.

7. A method according to claim 1 wherein said transversely offsetting is effected by a series of transversely offset conveyor units each having a leading edge engaging trailing ends of articles of a preceding set to assure lateral alignment of articles of said preceding set.

8. A metering device for metering sets of laterally adjacent articles supplied in longitudinal end-to-end touching relation into separate sets of articles, said metering device comprising a conveyor for supplying articles generally arranged in sets of laterally adjacent articles in rows at a preselected rate in said end-to-end touching relation, a conveyor unit for continuously receiving the rows of articles and having displacing means for conveying the articles in said rows at said preselected rate and at the same time transversely offsetting all articles of every other set relative to others of the sets at opposite ends of each offset set a distance less than the transverse dimension of said articles while maintaining said touching relationship with the transverse offsetting of articles in each offset set forming means for laterally aligning like articles in touching adjacent sets.

9. A metering device according to claim 8 wherein said displacing means comprises a conveyor member formed of first and second sets of article carriers arranged in a continuous series and in alternating relation.

10. A metering device according to claim 9 wherein said article carriers of one of said sets are transversely offset relative to article carriers of the other of said sets.

11. A metering device according to claim 9 wherein said article carriers of one of said sets are transversely offset relative to article carriers of the other of said sets, and each of said sets of article carriers has a longitudinal dimension corresponding to the length of articles to be metered.

12. A metering device according to claim 8 wherein said displacing means comprises two conveyor members having opposed runs, and each of said conveyor members being formed of first and second sets of article carriers arranged in a continuous series and in alternating relation.

13. A metering device according to claim 12 wherein said article carriers of said two conveyor members are transversely aligned along said runs.

14. A metering device according to claim 13 wherein said runs are generally horizontally disposed and vertically spaced.

15. A metering device according to claim 13 wherein said runs are generally horizontally disposed and vertically spaced, and article carriers of one of said sets of each of said carrier members is vertically offset relative to article carriers of the other of said sets.

16. A metering device according to claim 15 wherein transversely opposed ones of said carriers along said runs are equally vertically spaced substantially in accordance with the height of articles to be metered.

17. A metering device according to claim 9 wherein each of said sets of article carriers has a longitudinal dimension corresponding to the length of articles to be metered.

18. A metering device according to claim 8 together with a supply conveyor for continuously supplying articles to be metered in said rows.

19. A metering device according to claim 8 together with take-away means including a speed-up conveyor for rapidly advancing each metered sets of articles as it is discharged from said metering device, and a take-away conveyor for receiving separated articles and advancing the separated articles in uniformly spaced relation.

20. A metering device according to claim 19 together with wrapper means for wrapping each separated set of articles and forming a package.

* * * * *